UNITED STATES PATENT OFFICE.

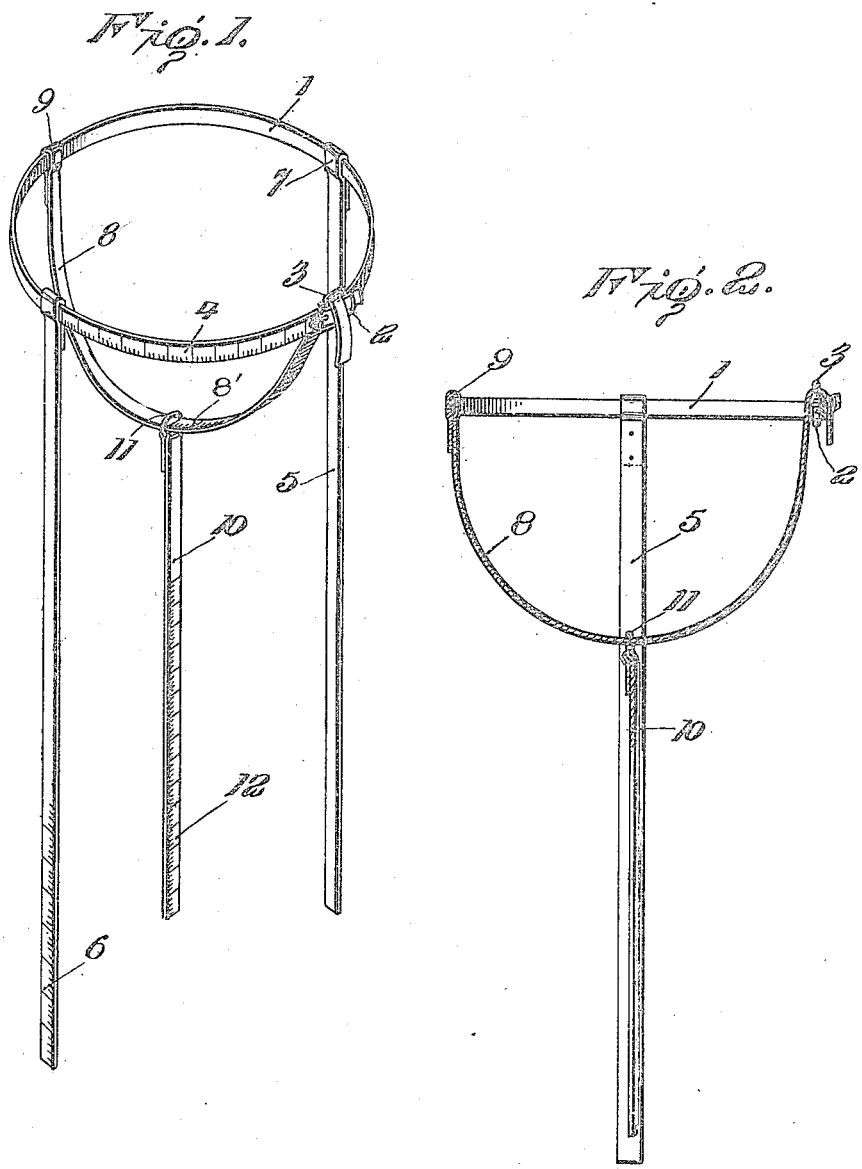

ISRAEL R. TAYLOR, OF ASBURY PARK, NEW JERSEY.

MEASURING DEVICE.

1,248,035.

Specification of Letters Patent.

Patented Nov. 27, 1917.

Application filed January 18, 1917. Serial No. 143,129.

*To all whom it may concern:*

Be it known that I, ISRAEL R. TAYLOR, a citizen of the United States, residing at Asbury Park, in the county of Monmouth and State of New Jersey, have invented certain new and useful Improvements in Measuring Devices, of which the following is a specification.

This invention has as its object to provide a measuring device for use by tailors in determining measurements for trousers and the primary aim of the invention is to provide a device for this purpose which may be quickly and conveniently applied to and removed from the person being measured. The invention further aims to provide a device for the purpose stated by the use of which the required measurements for the inner and outer seams of the trouser legs may be readily and conveniently ascertained.

In the accompanying drawings:

Figure 1 is a perspective view of the device embodying the present invention;

Fig. 2 is a vertical front to rear sectional view therethrough.

The device embodies a belt which is indicated in general by the numeral 1 and which is provided with a buckle 2 having upon its top bar a loop 3, the purpose of which will be presently explained. Upon its outer face the belt 1 is provided with a scale indicated by the numeral 4 and it will be understood that as the belt is drawn through the buckle 2 to fit about the waist of the person being measured, the waist measurement will be indicated by registration of the scale marks 4 with the end bar of the buckle 2. As a means for determining the measurements for the outer seams of the trouser legs, the belt 1 is provided at each side with a depending measuring tape indicated by the numeral 5 and provided upon its outer face with a series of scale marks 6. As will be observed by reference to the drawings these tapes are formed or provided at their upper ends with loops 7 which slidably engage the belt 1, thereby permitting of adjustment of the upper ends of the tapes about the belt so as to bring the tapes into proper position for taking the measurement referred to.

A strap 8 is provided at one end with a loop 9 which is slidably engaged with the belt 1 at the rear side thereof and the said strap is led forwardly and is slidably fitted through the loop 3 upon the buckle 2. In order that when the strap 8 has been drawn sufficiently tight the required measurement for the inside seams of the trouser legs may be obtained, a measuring tape 10 is provided and this tape at its upper end has connected with it a ring or loop 11 which slidably fits the strap 8. The tape 10 is provided upon one or both sides with a series of scale marks 12.

From the foregoing description of the invention it will be understood that the measuring tapes 5 as well as the strap 8 may be adjusted about the belt 1 to occupy their proper positions regardless of the waist measure of the person being fitted and it will also be understood that the ring or loop 10, being of greater diameter than the width of the strap 8, will automatically assume the proper position for measurement as the said strap is tightened by being drawn through the loop 3.

It will be understood that not only does the strap 8 serve as a means for so supporting the measuring tape 10 but that the same also serves as a means whereby the length of the crotch seam may be accurately determined, the said strap 8 being provided with a suitable series of scale marks 8' for this purpose and the scale marks being designed to be brought into register with the loop 3 upon the buckle 2.

Having thus described the invention, what is claimed as new is:

1. A measuring device including a belt, measuring tapes depending from the belt at opposite sides thereof, a strap connected at one end to the belt and adjustably connected at its other end to the belt, and a measuring tape depending from the said strap.

2. A measuring device including a belt, measuring tapes depending from the belt at opposite sides thereof and slidably adjustable along the belt, a strap adjustably connected with the rear and forward portions of the belt, and a measuring tape depending from the said strap.

3. A measuring device including a belt, a buckle connected with one end thereof and adjustably receiving the other end of the belt, the said buckle being provided with a loop, a strap slidably connected at one end with the rear portion of the belt and slidably adjustable through the said loop, a measuring tape depending from the said strap, and other measuring tapes depending from the belt at opposite sides thereof.

4. A measuring device including a belt, a buckle connected with one end thereof and adjustably receiving the other end of the belt, the said buckle being provided with a loop, and a strap connected at one end with the rear portion of the belt and slidably adjustable through said loop.

In testimony whereof I affix my signature.

ISRAEL R. TAYLOR. [L. S.]

Copies of this patent may be obtained for five cents each, by addressing the "Commissioner of Patents, Washington, D. C."